United States Patent
Uchida

(10) Patent No.: US 8,074,198 B2
(45) Date of Patent: Dec. 6, 2011

(54) APPARATUS AND METHOD FOR CIRCUIT LAYOUT USING LONGEST PATH AND SHORTEST PATH SEARCH ELEMENTS

(75) Inventor: Risako Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 685 days.

(21) Appl. No.: 12/216,966

(22) Filed: Jul. 14, 2008

(65) Prior Publication Data

US 2009/0064079 A1    Mar. 5, 2009

(30) Foreign Application Priority Data

Aug. 29, 2007 (JP) ................................. 2007-222081

(51) Int. Cl.
*G06F 17/50* (2006.01)

(52) U.S. Cl. .................... 716/126; 716/113; 716/136
(58) Field of Classification Search .................. 716/108, 716/111, 113, 126, 134, 136
See application file for complete search history.

(56) References Cited

U.S. PATENT DOCUMENTS

2005/0268258 A1* 12/2005 Decker .......................... 716/4

FOREIGN PATENT DOCUMENTS

| JP | 10-340291 | 12/1998 |
| JP | 11-213029 | 8/1999 |
| JP | 2003-223479 | 8/2003 |
| JP | 2005-228124 | 8/2005 |
| JP | 2006-293701 | 10/2006 |
| JP | 2006-301961 | 11/2006 |

OTHER PUBLICATIONS

Magma Design Automation, Co., Ltd. "Blast Plan Pro", Jun. 25, 2007, p. 2.

* cited by examiner

*Primary Examiner* — Vuthe Siek
(74) *Attorney, Agent, or Firm* — McGinn IP Law Group, PLLC

(57) ABSTRACT

An apparatus, includes a search unit which searches a critical signal path from a plurality of candidate signal paths connecting a first terminal and a second terminal, the critical signal path including the most strict delay limit in the plurality of candidate signal paths, and a display control unit which controls a display device for displaying an information regarding to a circuit element, the circuit element including the critical signal path.

8 Claims, 6 Drawing Sheets

| PATH NAME | STARTING POINT NAME | TNEMINAL POINT NAME |
|---|---|---|
| 504 | T01 | T03 |
| 505 | T02 | F01 |
| 506 | F01 | F02 |
| 507 | F01 | F02 |
| 508 | F02 | T03 |
| 509 | T02 | F03 |
| 510 | T02 | F03 |
| 511 | F03 | T03 |

| PATH NAME | STARTING POINT NAME | TNEMINAL POINT NAME | NUMBER OF LOGIC STAGES |
|---|---|---|---|
| 504 | T01 | T03 | 2 |
| 505 | T02 | F01 | 2 |
| 507 | F01 | F02 | 3 |
| 508 | F02 | T03 | 2 |
| 510 | T02 | F03 | 5 |
| 511 | F03 | T03 | 5 |

| PATH NAME | STARTING POINT NAME | TNEMINAL POINT NAME | NUMBER OF LOGIC STAGES | NUMBER OF FFs |
|---|---|---|---|---|
| 504 | T01 | T03 | 2 | 0 |
| 510,511 | T02 | T03 | 10 | 1 |

APPARATUS AND METHOD FOR CIRCUIT LAYOUT USING LONGEST PATH AND SHORTEST PATH SEARCH ELEMENTS

INCORPORATION BY REFERENCE

This application is based upon and claims the benefit of priority from Japanese patent application No. 2007-222081, filed on Aug. 29, 2007, the disclosure of which is incorporated herein in its entirety by reference.

BACKGROUND OF THE INVENTION

1. Field of the Invention

The present invention relates to a floor plan editing apparatus for semiconductor integrated circuits.

2. Description of Related Art

In designing a layout of a semiconductor integrated circuit, a floor planning is performed. "Floor planning" refers to determination of a layout of main component parts, such as hierarchical modules, which are portions of a semiconductor integrated circuit, terminals of the hierarchical modules, hard macros and terminals of the hard macros dialogically, performed by a designer using a graphical interface (GUI) of a computer before determination of a layout of components (logic gate elements and sequential circuits) of the semiconductor integrated circuit. An apparatus for supporting such an operation may be referred to as a "floor plan editing apparatus".

When a designer lays out a semiconductor integrated circuit by using the floor plan editing apparatus, floor planning of the semiconductor integrated circuit may be performed in the floor plan editing apparatus.

In the process of the floor planning, the shapes of hierarchical modules, a disposition of the hierarchical modules and positions of terminals are determined so as to avoid a state where the number of wiring lines between the hierarchical modules is so large that wiring with respect to the hierarchical modules in a wiring step performed after the floor planning becomes impossible, and a state where a wiring distance is so large that a delay time in transmission of signals becomes excessively long. Also, a disposition of hard macros, positions of terminals of the hierarchical module and distances between the hard macros may be determined so as to avoid a state where the terminal of one of the hierarchical modules or a terminal of one of the hard macros becomes so close to a terminal, which is connected with the terminal of the hierarchical modules or the terminal of the hard macros, that wiring process becomes impossible due to congestion of wiring, and a state where the wiring distance is so large that an unnecessary space may be made.

The floor plan editing apparatus enables the designer to easily recognize visually, for example, connection relationships, the number of wiring lines and the wiring distances between the hierarchical modules and the hard macros. The floor plan editing apparatus displays data which includes terminals and wirings (paths) between the terminals. The floor plan editing apparatus generates the data on the basis of circuit connection information (net nest) representing, for example, connection relationships, the number of wiring lines and a wiring distance between the terminals of the hierarchical modules, between terminals of the hierarchical modules and the hard macros and between the terminals of hard macros. Paths of the display data are displayed as line segments such as straight lines. Such display data is called a "rat's nest" or "fly-lines". For example, display of the rat's nest is described in Non-Patent Document 1.

In many cases, the terminals of the semiconductor integrated circuit may be connected to each other via a plurality of logic gate elements and a plurality of sequential circuits disposed in paths, particularly in paths between the terminals of the hierarchical modules and the terminals of hard macros and between the terminals of hard macros.

In Patent Document 1, when one or more the logic gate elements or the sequential circuits are disposed in a path between two terminals, the rat's nest showing the two terminals, the path and the logic elements and the sequential circuits, is displayed.

A designer may consider a delay in transmission of signals between terminals via the path to examine suitable positions for arranging the hierarchical modules and the hard macros on a chip. For example, a designer may examine suitable positions at which the terminals of the hierarchical modules and the terminals of the hard macros are disposed on a chip after considering whether or not the delay between the terminals may be within one clock cycle. However, when the designer lays out a semiconductor integrated circuit by using the floor plan editing apparatus in the related art, the floor plan editing apparatus only displays the rat's nest. It is difficult to examine the suitable positions at which the terminals of the hierarchical modules and the terminals of the hard macros based on only the rat's nest. Therefore, there is a need for enabling examination of the suitable positions at which the terminals of the hierarchical modules and the hard macros are disposed on the chip.

Related arts will be described below.

Japanese Patent Laid-Open No. 2006-293701, as the above-mentioned Patent Document 1, discloses a net display program for displaying connections between components to be mounted on a substrate. With the net display program, the computer executes a process of recognizing a plurality of components designated in components displayed on a screen, another process of tracing, in a direction in which an electrical signal propagates or in a direction in which the electrical signal is propagated, a connection destination with respect to a signal line connected to a terminal of a first component which is optionally one of the designated components, and another process of connecting, by a connection line, the first component and a designated second component different from the first component if a terminal of the second component is included in the traced signal line, and displaying the connection line.

Japanese Patent Laid-Open No. 2006-301961 discloses an automatic floor planning method (Patent Document 2). According to the automatic floor planning method, in designing a hierarchical layout of a semiconductor integrated circuit constituted by one (or more) black box block having at least block boundary input and output information and having a shape and area set in advance, and one (or more) white box block having information on constituent elements in the block and connections of the constituent elements as well as block boundary input and output information, the shapes and areas of the blocks are determined on the basis of the results of flat disposition made by developing and disposing a hierarchical structure.

The automatic floor planning method includes making the flat disposition by setting a polygonal shape, a circular shape or an elliptic shape in the black box block as a core region of the black box block and by permitting, with respect to a region other than the core region, overlapping between the positions at which the internal constituent elements of the black box block and the hierarchy-developed white box block are disposed, checking an overlap between the positions at which the internal constituent elements of the black box block and the white box block are disposed, and changing the shape and area of the black box block according to the overlap, and sequentially repeating the above-mentioned steps until a set condition is satisfied.

Japanese Patent Laid-Open No. 11-213029 discloses a register transfer level logical description hardware performance evaluation apparatus (Patent Document 3). The register transfer level logical description hardware performance evaluation apparatus has a register transfer level logical description input thereto, and makes a predictive evaluation of LSI hardware performance. This apparatus is provided with block area estimation means for determining the size of each of the blocks and the relative positional relationships between the blocks on the basis of the logical description, path delay computation means for obtaining net delays on the basis of information on the relative positional relationships between the blocks by considering three-dimensional capacities, power consumption computation means for computing power consumption, and inter-system evaluation means for displaying tradeoffs in evaluation values by the above-described means with respect a plurality of register transfer level logical descriptions.

Japanese Patent Laid-Open No. 10-340291 discloses a method of making a logical simulation model (Patent Document 4). The method of making a logical simulation model includes logical combination means for extracting a logical block from verified logic circuit information and optimizing the logic of the logic block, and delay information preparation means for extracting timing information from the logic circuit information, and erasing redundant processing by determining at the time of preparing a model an element operation sequence on the basis of the connection relationships between combination circuits and sequential elements while considering an asynchronous loop, whereby high-speed simulation is made possible.

Japanese Patent Laid-Open No. 2003-223479 discloses a circuit designing apparatus (Patent Document 5). The circuit designing apparatus is provided with a logic designing unit which performs logic designing with respect to a circuit to be designed, a disposition unit which disposes cells on the basis of the results of logic designing performed by the logic designing unit, and a wiring unit which performs wiring between the cells disposed by the disposition unit. A path tracing unit performs path tracing from one or more tracing start pins with respect to the results of disposition by the disposition unit or the results of wiring by the wiring unit, and a delay value computation unit, when pass tracing is performed by the path tracing unit, computes the maximum or minimum of totalized delay values from the one or more tracing start pins to pins of the cells to be disposed, through which paths extend. A gate stage number computation unit, in a state where a unit delay value is assigned to all the cells to be designed and where 0 is assigned as a delay value to all nets between the cells, after logic designing by the logic designing unit, makes the delay value computation unit compute the maximum or minimum of the totalized delay values while path tracing is being performed by the path tracing unit with respect to the results of logic designing performed by the logic designing unit. The gate stage number computation unit also computes the numbers of gate stages between sequential circuit cells or between input and output pins and the sequential circuit cells in the circuit to be designed on the basis of the maximum or minimum of the total delay values.

Japanese Patent Laid-Open No. 2005-228124 discloses a method of generating hierarchical blocks in a semiconductor integrated circuit design (Patent Document 6). In the method of generating hierarchical blocks in a semiconductor integrated circuit design, a plurality of hierarchical blocks are generated using a computer from circuit information in which logical hierarchy information about a semiconductor integrated circuit is held. This hierarchical block generating method includes a circuit structure extraction step of inputting circuit information in which logical hierarchy information about the semiconductor integrated circuit is held, and extracting a circuit structure from the input circuit information with respect to logical hierarchical layers in the semiconductor integrated circuit. Also included is a hierarchical block generation step of generating a plurality of hierarchical blocks by combining the logical hierarchical layers on the basis of the circuit structure of the logical hierarchical layers and outputting the structure of the generated hierarchical blocks.

[Non-Patent Document 1] "Blast Plan Pro" published from Magma Design Automation, Co., Ltd., catalog page 2, [online], 2005, [by search on Jun. 25, 2007], Internet <URL:http://www.magma-da.co.jp/product/image_pr/PDF/PanPro200506.pdf>

[Patent Document 1] Japanese Patent Laid-Open No. 2006-293701

[Patent Document 2] Japanese Patent Laid-Open No. 2006-301961

[Patent Document 3] Japanese Patent Laid-Open No. 11-213029

[Patent Document 4] Japanese Patent Laid-Open No. 10-340291

[Patent Document 5] Japanese Patent Laid-Open No. 2003-223479

[Patent Document 6] Japanese Patent Laid-Open No. 2005-228124

SUMMARY OF THE INVENTION

According to one exemplary aspect of the present invention, an apparatus, includes: a search unit which searches a critical signal path from a plurality of candidate signal paths connecting a first terminal and a second terminal, the critical signal path including the most strict delay limit in the plurality of candidate signal paths, and a display control unit which controls a display device for displaying an information regarding to a circuit element, the circuit element including the critical signal path.

According to another exemplary aspect of the present invention, an apparatus, includes: a search unit which searches a signal path connecting a first terminal and a second terminal, and a display control unit which controls a display device for displaying an information regarding to a circuit element, the circuit element including the signal path.

According to another exemplary aspect of the present invention, a method, includes: searching a critical signal path from a plurality of candidate signal paths connecting a first terminal and a second terminal, the critical signal path including the most strict delay limit in the plurality of candidate signal paths, and controlling a display device for displaying a number of a circuit element, the circuit element including the critical signal path.

According to another exemplary aspect of the present invention, a method, includes: searching a signal path connecting a first terminal and a second terminal, the signal path including the longest path length and the least signal processing time, and controlling a display device for displaying a number of a circuit element, the circuit element including the signal path.

BRIEF DESCRIPTION OF THE DRAWINGS

Other exemplary aspects and advantages of the invention will be made more apparent by the following detailed description and the accompanying drawings, wherein.

DETAILED DESCRIPTION OF THE EXEMPLARY EMBODIMENT

An exemplary feature of the present invention is to provide a floor plan editing apparatus for semiconductor integrated circuits capable of examining suitable positions at which terminals of hierarchical modules and the terminals of the hard macros are disposed on a chip.

Figure 1:
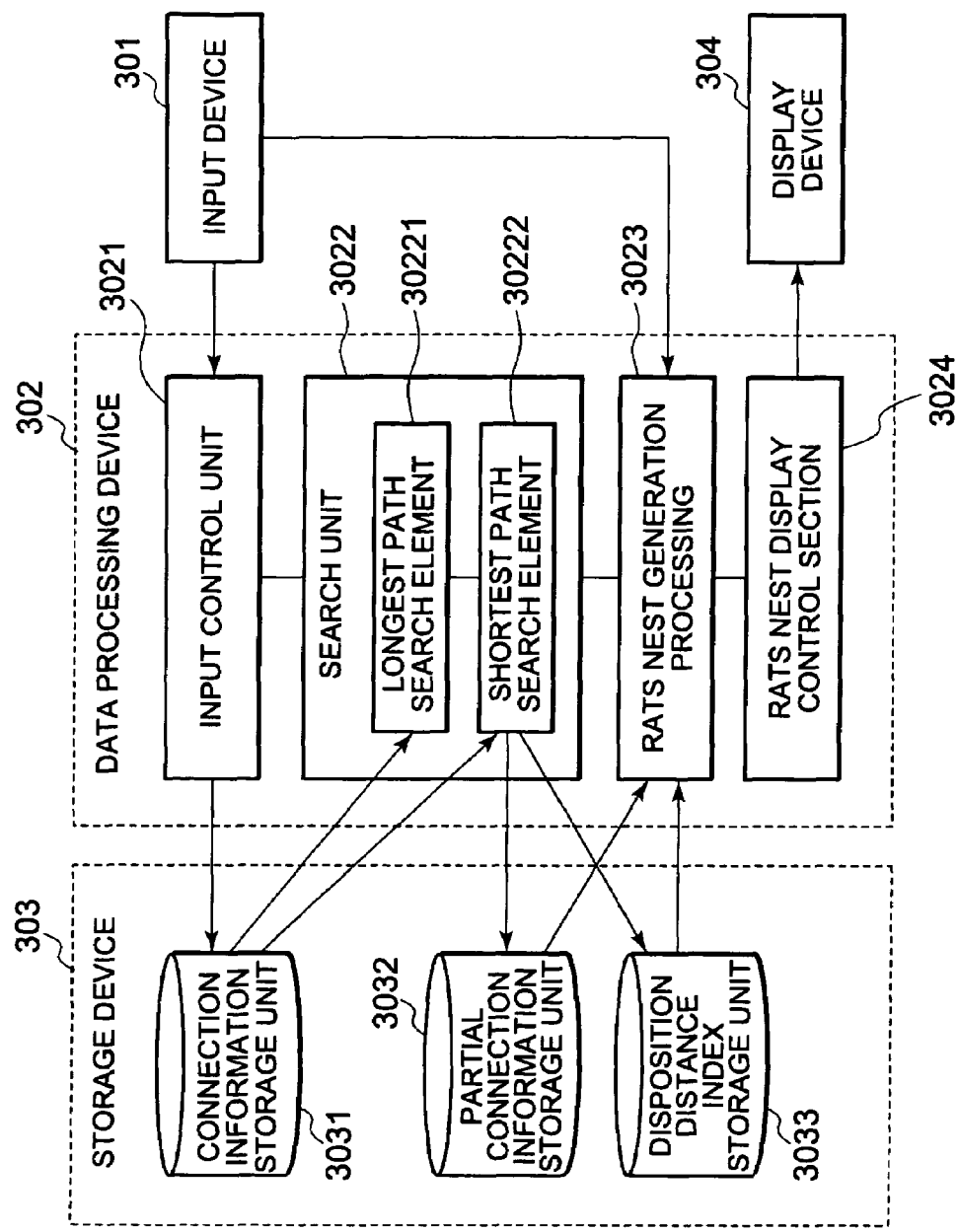
FIG. 1 is a block diagram showing a configuration of an exemplary embodiment.

FIG. 1 shows a configuration of the floor plan editing apparatus for semiconductor integrated circuits according to the present invention (hereinafter referred to as "floor plan editing apparatus of the present invention"). The floor plan editing apparatus of the present invention is a computer having an input device 301, a data processing device 302, a storage device 303 and a display device 304.

The input device 301 may be, for example, a keyboard, a pointing device (mouse) or the like.

The data processing device 302 may be a CPU (central processing unit) which executes a computer program, for example. The data processing device 302 includes an input control unit 3021, a search unit 3022, a rat's nest generation unit 3023 and a rat's nest display control unit 3024. The search unit 3022 includes a longest path search element 30221 and a shortest path search element 30222.

The storage device 303 includes a connection information storage unit 3031, a partial connection information storage unit 3032 and a disposition distance index storage unit 3033 and the above-mentioned computer program.

The input device 301 may be operated by a designer to input circuit connection information (e.g., net list) for laying out the semiconductor integrated circuit and output the net list to the input control unit 3021. The input control unit 3021 stores the net list in the connection information storage unit 3031.

The net list includes a plurality of terminals disposed based on a coordinate, M number of the paths ("M" may be an integer equal to or larger than 1), N number of the sequential circuits ("N" may be an integer equal to or larger than 0) disposed in each of the M number of paths and m number of logic gate elements ("m" may be an integer equal to or larger than 0) disposed in each of the M number of paths.

The M number of paths are disposed between a first terminal and a second terminal in a plurality of terminals. The N number of sequential circuits may be flip-flops or latch circuits, for example. In the following, the N number of sequential circuits are referred to as flip-flops. The m number of logic gate elements may be AND circuits, OR circuits, NAND circuits, NOT circuits and NOR circuits, for example. N for the number of the flip-flops and m for the number of the logic gate elements in the M number of paths differ from each other.

Each of the M number of paths includes a plurality of partial paths. The partial paths may include X number of starting-point partial paths ("X" may be an integer equal to or larger than 1), Y number of intermediate partial paths ("Y" may be an integer equal to or larger than 1) and Z number of terminal-point partial paths ("Z" may be an integer equal to or larger than 1).

The X number of starting-point partial paths may include x number of logic gate elements ("x" may be an integer satisfying x<m) in the m number of logic gate elements disposed between the first terminal and a first flip-flop of the N number of sequential circuits (in a case where N is equal to or larger than 1).

The Y number of intermediate partial paths may include y number of logic gate elements ("y" may be an integer satisfying y<m) in the m number of logic gate elements disposed between the Jth flip-flop in the N number of sequential circuits ("J" may be an integer satisfying $1 \leq J \leq (N-1)$ in a case where N is equal to or larger than 2) and the (J+1)th flip-flop in the N number of sequential circuits.

The Z number of terminal-point partial paths may include z number of logic gate elements ("z" may be an integer satisfying z<m) in the m number of logic gate elements disposed between the Nth flip-flop in the N number of sequential circuits (in a case where N is equal to or larger than 1) and the second terminal. Numbers x, y, and z for the numbers of logic gate elements (assumed to be the numbers of partial logic gate elements) in the M number of paths differ from each other.

The longest path search element 30221 executes a longest-path search process by referring to the connection information storage unit 3031. In the longest-path search process, the longest path search element 30221 searches largest partial paths from the X number of starting-point partial paths, the Y number of intermediate partial paths and the Z number of terminal-point partial paths respectively. Each of the largest partial paths includes the largest numbers x, y and z of partial logic gate elements Each of the largest partial paths is referred as a "selected starting-point path", a "selected intermediate path" and a "selected terminal-point path", respectively. The larger the number of logic gate elements in one partial path, the longer the partial path. Therefore the selected starting-point path, the selected intermediate path and the selected terminal-point path are obtained as the longest paths by the search. The paths searched by the longest path search element 30221 may be referred as "first temporary paths".

Thereafter, the longest path search element 30221 stores the selected starting-point path, the selected intermediate path and the selected terminal-point path and the corresponding numbers x, y, and z of partial logic gate elements in the partial connection information storage unit 3032.

The shortest path search element 30222 executes a shortest-path search process by referring to the partial connection information storage unit 3032. In the shortest-path search process, the shortest path search element 30222 searches a shortest path from the M number of paths. The shortest path includes the smallest number N of flip-flops. The shortest path is referred as a "selected path". The smaller the number of flip-flops is, the shorter the time taken for processing on the path is. Therefore, the selected path is obtained as the shortest path by the shortest-path search process.

Thereafter, the shortest path search element 30222 stores in the disposition distance index storage unit 3033 the selected path, the number m of logic gate elements which is the sum of the numbers x, y, and z of partial logic gate elements respectively corresponding to the selected starting-point path, selected intermediate path and selected terminal-point path contained in the selected path, and the smallest number of flip-flops, i.e., the number N of flip-flops with respect to the selected path. The path searched by the shortest path search element 30222 may be referred as a "second temporary path".

The second temporary path may be referred to as a "critical signal path" including the longest path length and the least signal processing time.

The input device 301 inputs a request for display of the rat's nest by the designer. When the input device 301 get the request for display of the rat's nest with respect to the second terminal designated by the designer, for example, the rat's nest generation unit 3023 refers to the connection information storage unit 3031 and the disposition distance index storage unit 3033 and generates the rat's nest showing the first terminal, the second terminal and the selected path, and a character sequence representing the number m of logic gate elements with respect to the selected path and the smallest number N of flip-flops with respect to the selected path.

The rat's nest display control unit 3024 displays the rat's nest and the character sequence on the display device 304 by associating the rat's nest and the character sequence with each other. The selected path in the rat's nest is displayed as a line connecting the first terminal and the second terminal on the display device 304.

Figure 2:
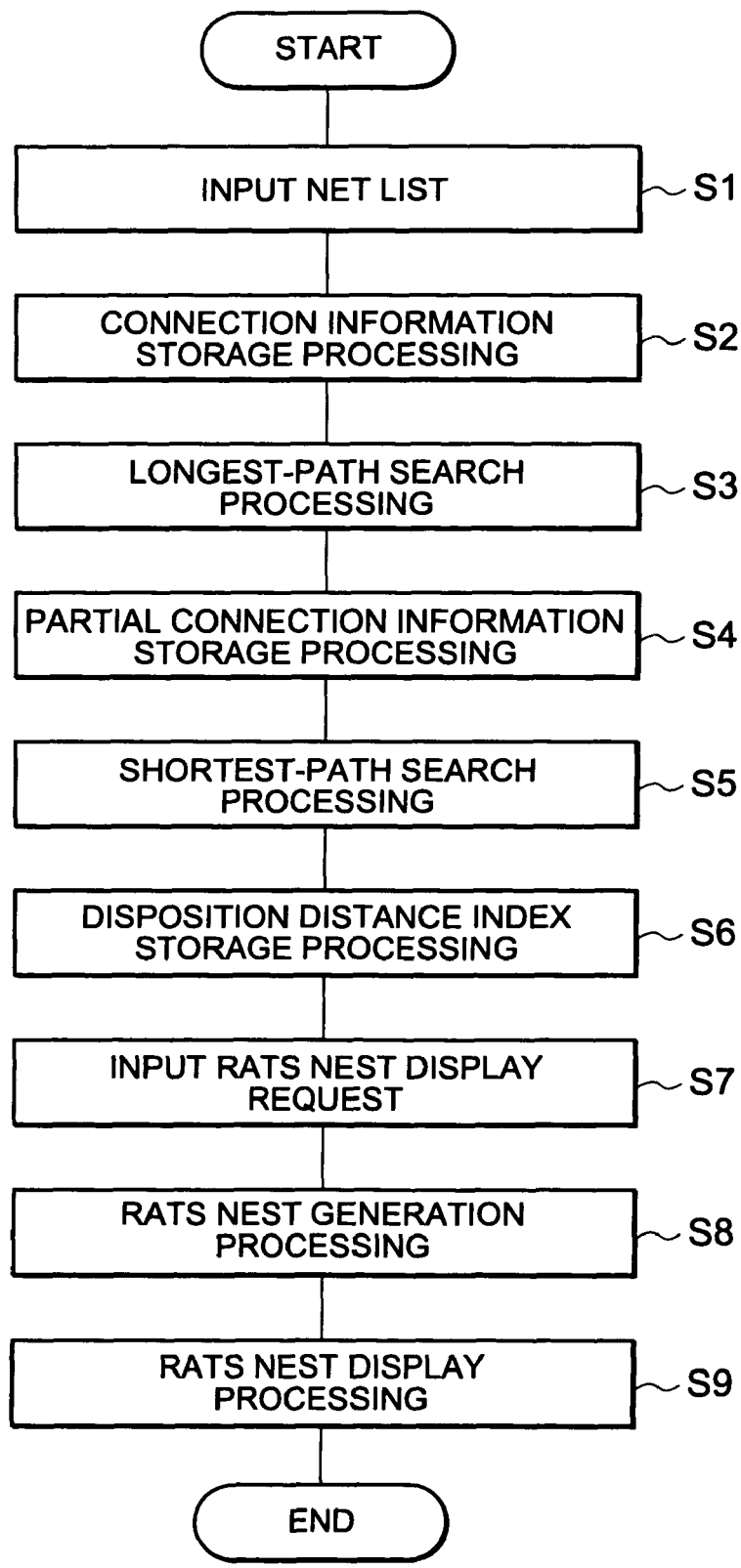
FIG. 2 is a flowchart showing an exemplary operation of the exemplary embodiment.

FIG. 2 is a flowchart showing an exemplary operation of the floor plan editing apparatus of the exemplary embodiment.

Figure 3:
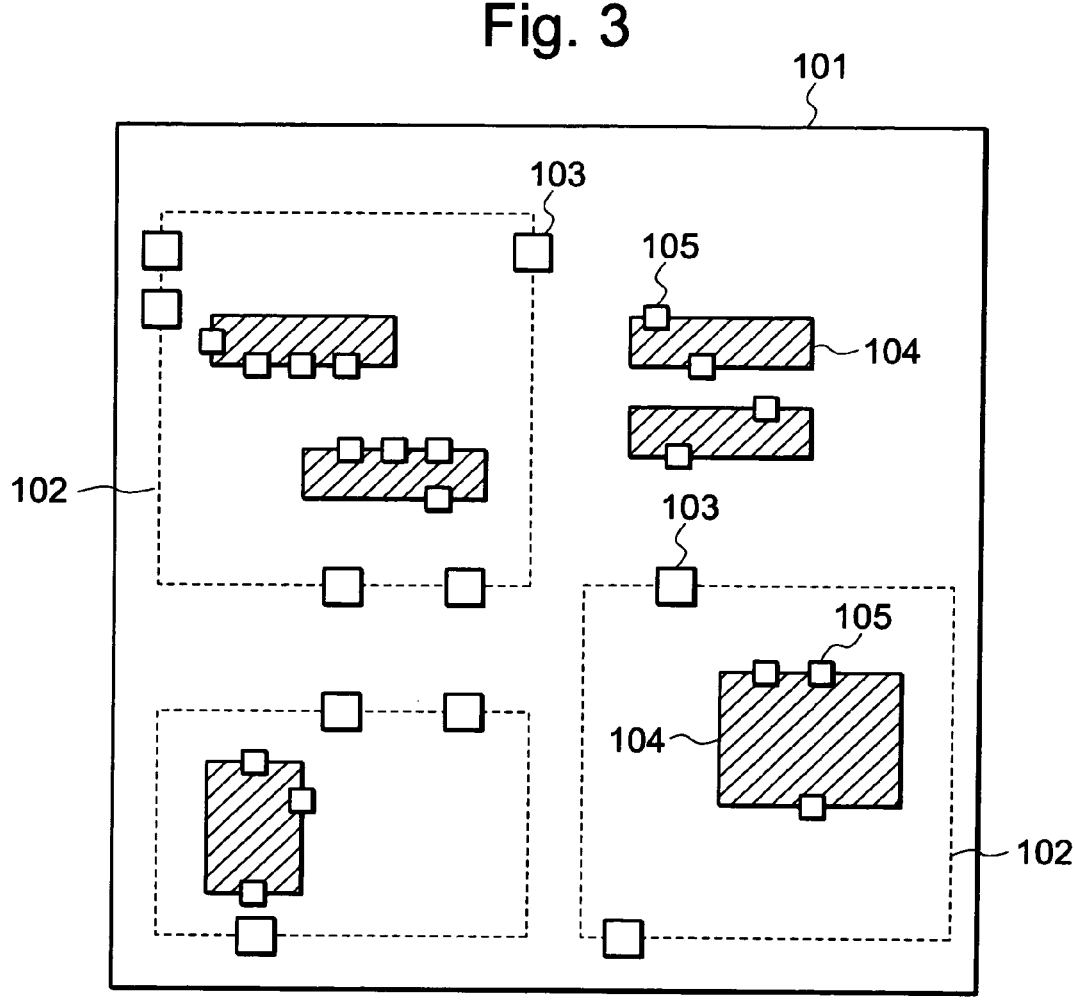
FIG. 3 is an exemplary layout of a semiconductor integrated circuit.

The designer lays out the semiconductor integrated circuit by using the floor plan editing apparatus of the present invention. FIG. 3 shows the semiconductor integrated circuit laid out by using the floor plan editing apparatus of the present invention. The semiconductor integrated circuit may include hierarchical modules 102 including connection terminals 103 and hard macros 104 including connection terminals 105. Each of the hierarchical modules 102 may be provided on a chip 101. Each of the hard macros 104 may be provided on the chip 101 or in the hierarchical module 102.

The input device 301 may be operated by the designer to input the net list for laying out the semiconductor integrated circuit and output the net list to the input control unit 3021 (step S1). At this time, the input control unit 3021 executes connection information storage processing for storing the net list from the input device 301 in the connection information storage unit 3031 (step S2).

Figure 4A:
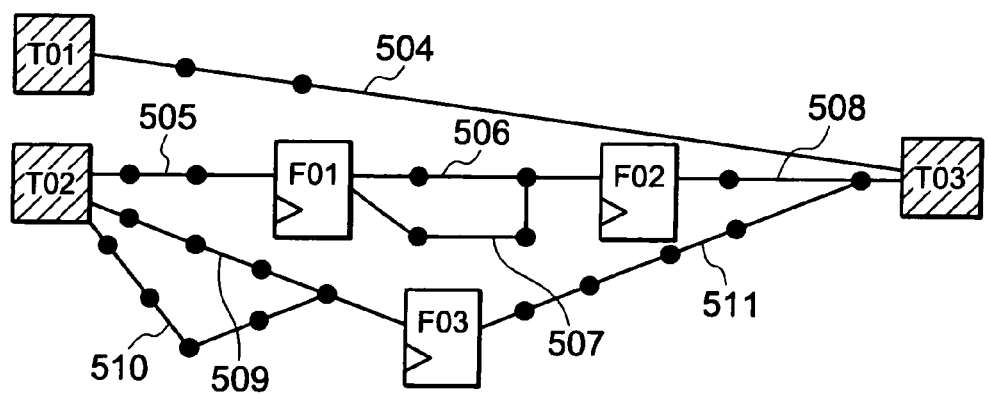
FIG. 4A is a schematic diagram showing an exemplary net list.
Figures 4B, 5A, 5B:
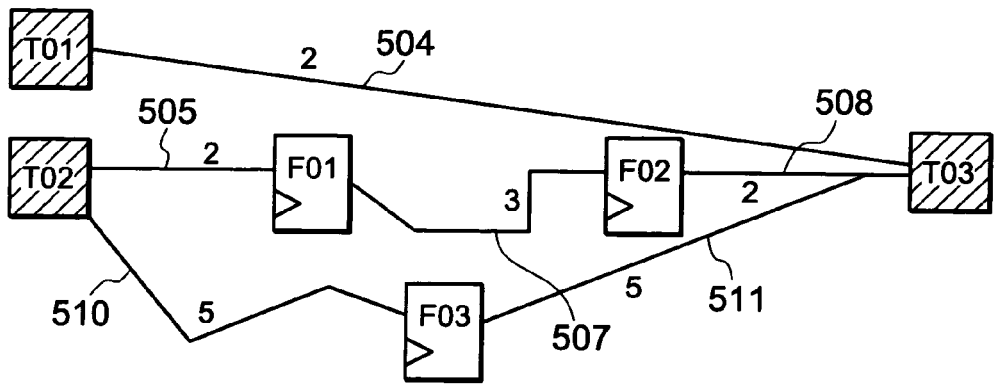
FIG. 4B shows a data format of the exemplary net list.
FIG. 5A is a schematic diagram showing the exemplary net list.
FIG. 5B shows a data format of the exemplary net list.

FIG. 4A is a schematic diagram showing the net list when connection information storage processing is executed. FIG. 4B shows the net list stored in the connection information storage unit 3031.

As described above, the net list includes a plurality of terminals T01 to T03 disposed based on the coordinate. Each of the plurality of terminals T01 to T03 may represent one of the connection terminals 103 of the hierarchical modules 102 and the connection terminals 105 of the hard macros 104, for example.

As described above, the net list further contains M number of paths (M set to 3 in the exemplary operation). Three paths are assumed to be a first path which includes a partial path 504, a second path which includes partial paths 505, 506, 507 and 508, and a third path which includes partial paths 509, 510 and 511. The first path is disposed between the terminal T01 and the terminal T03. The second path and the third path are disposed between the terminal T02 and the terminal T03.

As described above, the net list further contains N number of flip-flops disposed in each of the second path and the third path. If N is set to "0", "2" and "1" respectively, then the first path does not include the flip-flop, the second path includes two flip-flops, and the third path includes three flip-flops. Two flip-flops F01 and F02 are disposed in the second path. One flip-flop F03 is disposed in the third path. Thus, the numbers N of flip-flops in the paths (505, 506, 507, 508) and (509, 510, 511) differ from each other.

In the first path, two logic gate elements are disposed between the terminal T01, which is a starting point, and the terminal T03, which is a terminal ending point.

The second path includes X number of the starting-point partial paths (X set to 1 in the exemplary operation, i.e., the partial path 505), Y number of the intermediate partial paths (Y set to 2 in the exemplary operation, i.e., the partial path 506 and 507), and Z number of the terminal-point partial paths (Z set to 1 in the exemplary operation, i.e., the partial path 508).

In the starting-point partial path 505, x number of logic gate elements (x set to "2" in the exemplary operation) are disposed between the terminal T02, which is a starting point, and the first flip-flop F01, which is a terminal point. In each of the intermediate partial paths 506 and 507, y number of logic gate elements (y set to "2" or "3" in the exemplary operation) are disposed between the first flip-flop F01, which is a starting point, and the second flip-flop F02, which is a terminal ending point.

In other words, the partial path 506 includes two logic gate elements, and the partial path 507 includes three logic gate elements. In the terminal-point partial path 508, z number of logic gate elements (z set to "2" in the exemplary operation) are disposed between the second flip-flop F02, which is a starting point, and the terminal T03, which is a terminal ending point.

Thus, the numbers x, y, z of partial logic gate elements in each of the partial paths 505, 506, 507 and 508 differ from each other. The "m" which corresponds to the number of the logic circuit elements of the second path is set to "6" when the partial path 506 is selected from the partial path 506 and 507, or set to "7" when the partial path 507 is selected from the partial path 506 and 507.

The third path includes X number of starting-point partial paths (X set to 2 in the exemplary operation, i.e., the partial paths 509 and 510), Y number of intermediate partial paths (Y set to 0 in the exemplary operation, i.e., in the case where "N" which corresponds to the number of the flip-flops in the third path is 1, the "Y" is set to 0), and Z number of terminal-point partial paths (Z set to 1 in the exemplary operation, i.e., the partial path 511).

In each of the starting-point partial paths (the partial path 509 or 510), x number of logic gate elements (x set to "4" or "5" in the exemplary operation) are disposed between the terminal T02, which is a starting point, and the flip-flop F03, which is a terminal point. In the terminal-point partial path (the partial path 511), z number of logic gate elements (z set to "5" in the exemplary operation) are disposed between the flip-flop F03, which is a starting point, and the terminal T03, which is a terminal ending point.

Thus, the numbers x, y, z of partial logic gate elements in the each of the partial paths 509, 510 and 511) differ from each other. The "m" which corresponds to the number of the logic circuit elements of the third path is set to "9" when the partial path 509 is selected from the partial path 509 and 510, or set to "10" when the partial path 510 is selected from the partial path 509 and 510.

The longest path search element 30221 executes a longest-path search process by referring to the connection information storage unit 3031, setting some of the hierarchical modules 102, the hard macros 104 and the flip-flops as starting and terminal points and setting the logic gate elements as middle points (step S3). FIG. 5A is a schematic diagram showing the net list when longest-path search processing is executed.

In longest-path search process (step S3), the longest path search element 30221 searches the partial paths including the largest numbers of partial logic gate elements as the selected starting-point path, the selected intermediate path and the selected terminal-point path from the starting-point partial path 505, the intermediate partial paths 506 and 507, and the terminal-point partial path 508.

The longest path search element 30221 obtains the starting-point partial path 505 as selected starting-point path 505 by the longest-path search process. In the exemplary operation, the number of partial logic gate elements in the selected starting-point path 505 is "2". The longest path search element 30221 also obtains the intermediate partial path 507 including the largest number of partial logic gate elements as selected intermediate path 507 by the longest-path search process from the intermediate partial paths 506 and 507. In the exemplary operation, the number of partial logic gate elements in the selected intermediate path 507 is "3".

The longest path search element 30221 also obtains the terminal-point partial path 508 as selected terminal-point path 508 by the longest-path search process. In the exemplary operation, the number of partial logic gate elements in the selected terminal-point path 508 is "2".

As described above, the larger the number of logic gate elements in one partial path, the longer the partial path. Therefore the selected starting-point path 505, the selected intermediate path 507 and the selected terminal-point path 508 are selected as the longest paths by the longest-path search process.

Also in longest-path search process (step S3), the longest path search element 30221 searches the partial paths including the largest numbers of partial logic gate elements as the selected starting-point path and the selected terminal-point path from the starting-point partial paths 509 and 510, and the terminal-point partial path 511.

The longest path search element 30221 obtains the starting-point partial path 510 as selected starting-point path 510 by the longest-path search process from the two starting-point partial paths 509 and 510. In the exemplary operation, the number of partial logic gate elements in the selected starting-point path 510 is "5". The longest path search element 30221 also obtains the terminal-point partial path 511 as selected terminal-point path 511 by the longest-path search process. In this case, the number of partial logic gate elements in the selected terminal-point path 511 is "5".

As described above, the larger the number of logic gate elements in one partial path, the longer the partial path. Therefore the selected starting-point path 510 and the selected terminal-point 511 are obtained as the longest paths by the longest-path search process.

The longest path search element 30221 executes partial connection information storage processing (step S4) when longest-path search processing is executed. FIG. 5B shows the net list stored in the partial connection information storage unit 3032 when partial connection information storage processing is executed.

In partial connection information storage processing (step S4), the longest path search element 30221 stores in the partial connection information storage unit 3032 the first path and the number of logic gate elements "2" associated with the first path.

Also in partial connection information storage processing (step S4), the longest path search element 30221 stores in the partial connection information storage unit 3032 the selected starting-point path 505, the selected intermediate path 507 and the selected terminal-point path 508 in the second path and the numbers of partial logic gate elements "2", "3" and "2" associated with the selected paths, respectively.

Also in partial connection information storage processing (step S4), the longest path search element 30221 stores in the partial connection information storage unit 3032 the selected starting-point path 510 and the selected terminal-point path 511 in the third path and the numbers of partial logic gate elements "5" and "5" associated with the selected paths, respectively.

Figures 6A, 6B:
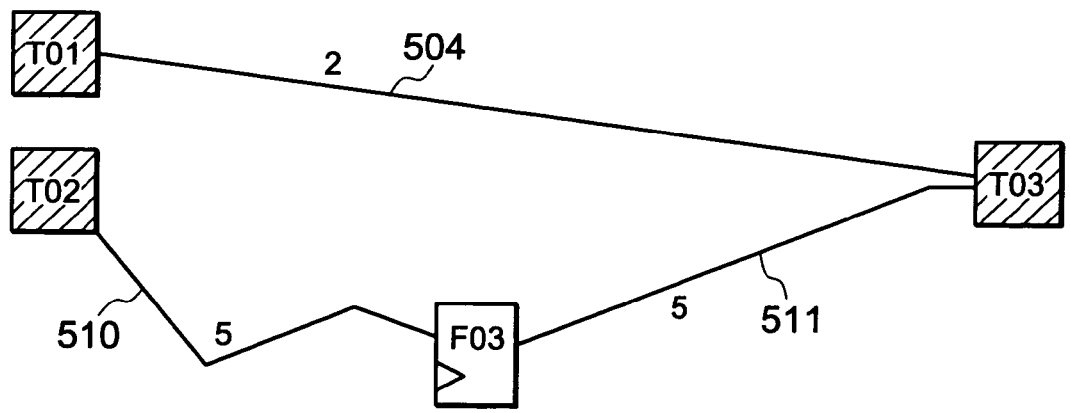
FIG. 6A is a schematic diagram showing the exemplary net list.
FIG. 6B shows a data format of the exemplary net list.

The shortest path search element 30222 executes shortest-path search process by referring to the partial connection information storage unit 3032. The shortest path may be set by some of the hierarchical modules 102 and the hard macros 104 as starting and terminal ending points, and the flip-flops as middle points (step S5). FIG. 6A is a schematic diagram showing the net list when shortest-path search processing is executed.

In shortest-path search processing (step S5), the shortest path search element 30222 searches the shortest path from the longest path which includes the partial paths 505, 507 and 508 and the longest path which includes the partial path 510, 511. These longest paths are searched by the longest-path search element 30221. The shortest path includes the smallest number N of flip-flops as a selected path. In the exemplary operation, the shortest path search element 30222 obtains the longest path which includes the partial paths 510 and 511, the longest path includes the smallest number N of flip-flops compared with other longest path which is searched by the longest-path search element 30221.

As described above, the smaller the number of flip-flops in one path, the shorter the time taken for processing on the path. Therefore, the selected path which includes the partial paths 510 and 511 is obtained as the shortest path by the shortest path search process.

The shortest path search element 30222 executes disposition distance index storage processing (step S6) when the shortest path search process is executed. FIG. 6B shows the net list stored in the disposition distance index storage unit 3033 when disposition distance index storage processing is executed.

In disposition distance index storage processing (step S6), the shortest path search element 30222 stores in the disposition distance index storage unit 3033 the first path, the number of logic gate elements "2" for the first path and the number of flip-flops "0" for the first path.

Also in disposition distance index storage processing (step S6), the shortest path search element 30222 stores, in the disposition distance index storage unit 3033, the selected path which includes the partial paths 510 and 511, the selected starting-point path 510 included in the selected path which includes the partial paths 510 and 511, the number of logic gate elements "10" which is the sum of the numbers of partial logic gate elements "5", "0" and 11511 respectively for the selected starting-point path 510, the selected intermediate path (there is no selected intermediate path in the third path of the exemplary operation) and the selected terminal-point path 511 contained in the selected path including the partial path 510 and 511, and the smallest number of flip-flops "1" which is the number of flip-flops in the selected path including the partial path 510 and 511.

The input device 301 inputs the rat's nest display request with respect to the terminal T03 designated by the designer. In this case, the rat's nest display request is input to the rat's nest generation unit 3023 (step S7).

Figure 7:
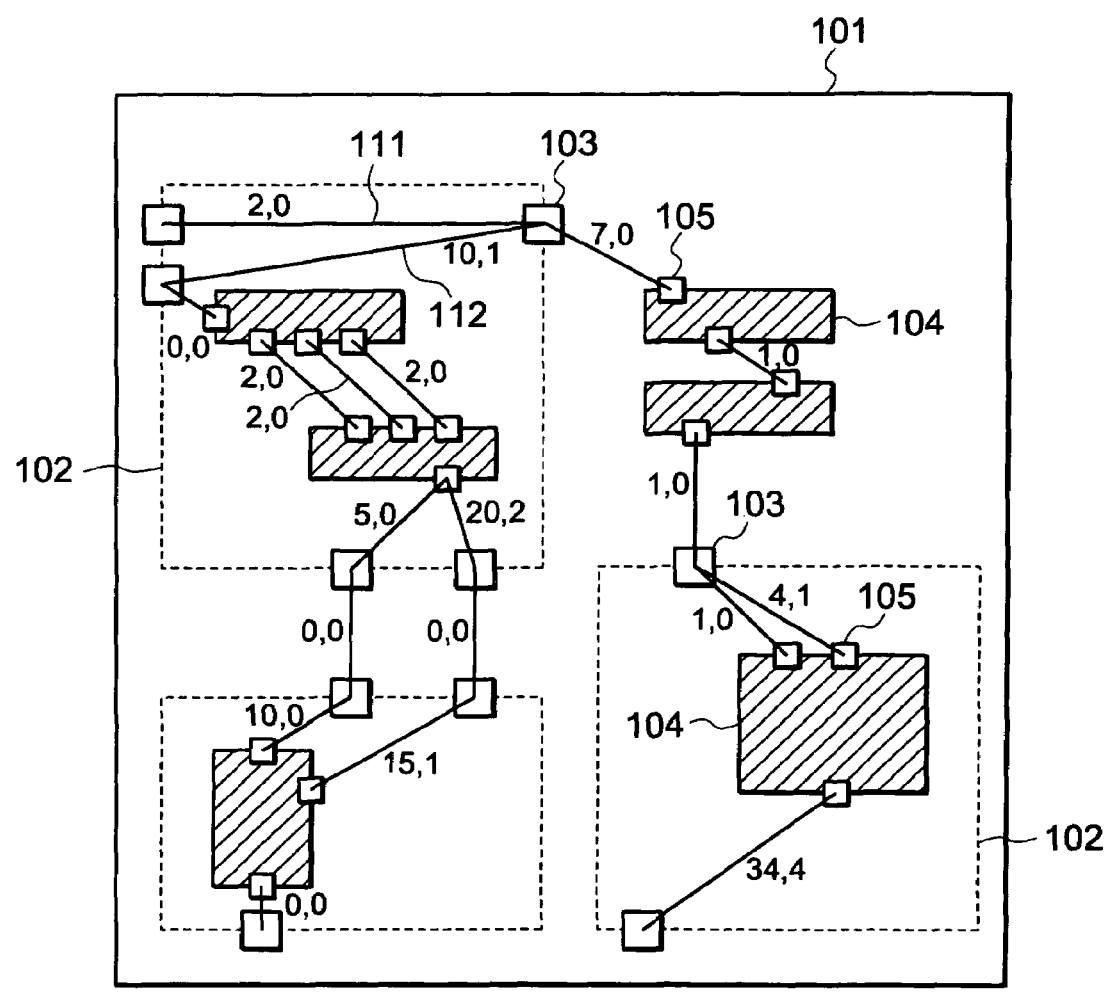
FIG. 7 is an exemplary rat's nest of the exemplary embodiment.

FIG. 7 shows the semiconductor integrated circuit displayed in rat's nest form by using the floor plan editing apparatus of the present invention.

The rat's nest generation unit 3023 executes rat's nest generation process in response to the rat's nest display request by referring to the connection information storage unit 3031 and the disposition distance index storage unit 3033 (step S8).

In rat's nest generation process (step S8), the rat's nest generation unit 3023 generates a rat's nest 111 showing the terminal T01, the terminal T02 and the path (504) and a character sequence (2, 0) representing the number of logic gate elements "2" for the path (504) and the smallest number of flip-flops "0" for the path (504).

Also in rat's nest generation process (step S8), the rat's nest generation unit 3023 generates a rat's nest 112 showing the terminal T02, the terminal T03 and the selected path (510, 511) and a character sequence "10, 1" representing the number of logic gate elements "10" for the selected path (510, 511) and the smallest number of flip-flops "1" for the selected path (510, 511).

The rat's nest display control unit 3024 executes rat's nest display process (step S9) when a rat's nest generation process is executed.

In rat's nest display process (step S9), the rat's nest display control unit 3024 displays the rat's nest 111 and the character sequence "2, 0" on the display device 304 by associating the rat's nest 111 and the character sequence "2, 0" with each other. The selected path (504) in the rat's nest 111 may be displayed as a line connecting the terminal T01 and the terminal T02 on the display device 304, and the character sequence "2, 0" may be displayed as the number of logic gate elements "2" and the number of flip-flops "0" in this order on the display device 304.

Also in rat's nest display process (step S9), the rat's nest display control unit 3024 displays the rat's nest 112 and the character sequence "10, 1" on the display device 304 by associating the rat's nest 112 and the character sequence "10, 1" with each other. The selected path (510, 511) in the rat's nest 112 may be displayed as a line connecting the terminal T02 and the terminal T03 on the display device 304, and the character sequence "10, 1" may be displayed as the number of logic gate elements "10" and the number of flip-flops "1" in this order on the display device 304.

Thus, the semiconductor integrated circuit may be displayed in rat's nest form by using the floor plan editing apparatus of the present invention. While the flip-flops F01, F02, and F03 are mentioned as the sequential circuits in the above, the sequential circuits may alternatively be latch circuits F01, F02, and F03.

The designer may consider delays in transmission of signals between terminals in the case of examining suitable positions for disposition of the hierarchical modules 102 and the hard macros 104 on the chip 101. For example, the designer may examine suitable positions at which terminals of the hierarchical modules and the hard macros are disposed on the chip after considering whether or not delays between the terminals fall within one clock cycle.

In the floor plan editing apparatus of the present invention, the shortest path search process is executed to obtain the path including the smallest number N of flip-flops as a selected path from the first path, the second path and the third path. As a result of this process, the rat's nest (the first terminal, the second terminal and the selected circuit) and a character sequence (the number m of logic gate elements and the smallest number N of flip-flops) may be displayed on the display device 304. For example, in a case where no flip-flop exists in the selected path, it is necessary for the designer to limit the delay between the terminals so that the delay is shorter than one clock cycle. For example, in a case where one flip-flop exists in the selected path, it is necessary for the designer to limit the delay between the first terminal or the second terminal and the flip-flop so that the delays are shorter than one clock cycle.

Thus, when the floor plan editing apparatus of the present invention displays the rat's nest 112 and the character sequence "10, 1" for example, it enables the designer to consider the delay between the terminals and the clock cycle with respect to the smallest number N of flip-flops. In this way, the floor plan editing apparatus of the present invention enables examination of suitable positions at which the hierarchical modules 102 and the hard macros 104 are disposed on the chip 101.

Also, in the floor plan editing apparatus of the present invention, the longest path search process is executed to obtain the partial paths including the largest numbers x, y, and z of partial logic gate elements as the selected starting-point path, the selected intermediate path and the selected terminal-point path from the second path and the third path.

As a result of this process, the rat's nest (the first terminal, the second terminal and the selected path (the selected starting-point path, selected intermediate path and selected terminal-point path)) and the character sequence (the number m of logic gate elements (m=x+y+z), the minimum number N of flip-flops) may be displayed on the display device 304.

For example, in a case where the largest number m of logic gate elements is equal to or smaller than a specified number, it is necessary for the designer to limit the delay between the terminals so that the delay is shorter than one clock cycle, even if no flip-flop exists in the selected path. For example, in a case where one flip-flop exists in the selected path and the largest number m of logic gate elements is equal to or smaller than a specified number, it is necessary for the designer to limit the delay between the first terminal or the second terminal and the flip-flop so that the delay is shorter than one clock cycle.

Thus, when the floor plan editing apparatus of the present invention displays the rat's nest 112 and the character sequence "10, 1" for example, it enables the designer to consider the delay between the terminals and the clock cycle with respect to the largest number m of logic gate elements and the smallest number N of flip-flops. In this way, the floor plan editing apparatus of the present invention enables examination of suitable positions at which the hierarchical modules 102 and the hard macros 104 are disposed on the chip 101.

Further, it is noted that applicant's intent is to encompass equivalents of all claim elements, even if amended later during prosecution.

What is claimed is:

1. An apparatus, comprising:
  a longest path search element which searches equal to or greater than one longest path from each of equal to or greater than one candidate signal paths comprising equal to or greater than one partial path between a first terminal or a second terminal and a sequential circuit, said longest path comprising equal to or greater than one partial path including a largest number of logic gates of said partial paths;
  a shortest path search element which searches a shortest path from said equal to or greater than one longest path, said shortest path including a least number of said sequential circuit of said equal to or greater than one longest path; and a display control unit that controls a display device for displaying information regarding a circuit element, said circuit element comprising said shortest path and a number of said logic gates included in said shortest path.

2. The apparatus of claim 1, further comprising:
a partial connection information storage unit, the longest path search element storing a selected starting-point path, a selected intermediate path, and a selected terminal-point path and corresponding numbers of said logic gates in the partial connection information storage unit.

3. The apparatus of claim 2, wherein the shortest path search element executes a shortest-path search process by referring to the partial connection information storage unit.

4. The apparatus of claim 1, wherein a larger number of logic gates in said one partial path provides a longer partial path.

5. A method, comprising:
searching equal to or greater than one longest path from each of equal to or greater than one candidate signal paths comprising equal to or greater than one partial path between a first terminal or a second terminal and a sequential circuit, said longest path comprising equal to or greater than one partial path including a largest number of logic gates of said partial paths, as executed by a processing unit on a computer;
searching a shortest path from said equal to or greater than one longest path, said shortest path including a least number of said sequential circuit of said equal to or greater than one longest path; and
controlling a display device for displaying information regarding a circuit element, said circuit element comprising said shortest path and a number of said logic gates included in said shortest path.

6. The method of claim 5, further comprising:
storing in a partial connection information storage unit a selected starting-point path, a selected intermediate path, and a selected terminal-point path and corresponding numbers of said logic gates.

7. The method of claim 6, wherein said searching the shortest path comprises executing a shortest-path search process by referring to the partial connection information storage unit.

8. The method of claim 5, wherein a larger number of logic gates in said one partial path provides a longer partial path.

* * * * *